United States Patent
Kanbur et al.

(10) Patent No.: US 9,192,262 B2
(45) Date of Patent: Nov. 24, 2015

(54) ROASTING AND/OR GRILLING APPARATUS AND HEATING INSERT FOR A ROASTING AND/OR GRILLING APPARATUS OF THIS KIND

(75) Inventors: Erdogan Kanbur, Gechingen (DE); Sendogan Kanbur, Gechingen (DE)

(73) Assignee: Sendogan Kanbur, Gechingen (DE)

( * ) Notice: Subject to any disclaimer, the term of this patent is extended or adjusted under 35 U.S.C. 154(b) by 357 days.

(21) Appl. No.: 13/637,143

(22) PCT Filed: Mar. 23, 2011

(86) PCT No.: PCT/EP2011/054488
§ 371 (c)(1), (2), (4) Date: Nov. 19, 2012

(87) PCT Pub. No.: WO2011/117315
PCT Pub. Date: Sep. 29, 2011

(65) Prior Publication Data
US 2013/0055906 A1 Mar. 7, 2013

(30) Foreign Application Priority Data
Mar. 25, 2010 (DE) .......... 10 2010 013 437

(51) Int. Cl.
A47J 37/06 (2006.01)
A47J 37/07 (2006.01)
A47J 37/04 (2006.01)

(52) U.S. Cl.
CPC .......... *A47J 37/0623* (2013.01); *A47J 37/0718* (2013.01); *A47J 37/043* (2013.01); *A47J 37/0722* (2013.01); *A47J 37/0727* (2013.01)

(58) Field of Classification Search
CPC .............. A47J 37/0704; A47J 37/0718; A47J 37/0722; A47J 37/0727
USPC .......... 99/390, 339, 448, 450, 340; 126/25 R, 126/41 R, 275 R, 26
See application file for complete search history.

(56) References Cited

U.S. PATENT DOCUMENTS 1,046,734 A * 12/1912 Campbell ................. 126/275 R
2,581,570 A * 1/1952 Amanatides ................ 99/421 V
(Continued)

FOREIGN PATENT DOCUMENTS

CN 201015384 Y 2/2008
CN 101185514 A 5/2008
(Continued)

OTHER PUBLICATIONS

Notification of Transmittal of Copies of Translation of the International Preliminary Report on Patentability (Form PCT/IB/338) dated Oct. 4, 2012 (1 page).
(Continued)

*Primary Examiner* — Reginald L Alexander
(74) *Attorney, Agent, or Firm* — Flynn, Thiel, Boutell & Tanis, P.C.

(57) ABSTRACT

A roasting and/or grilling apparatus for cooking purposes, having a cooking chamber, a food holding unit arranged in the cooking chamber, and a combustion chamber for arranging a heating apparatus. The combustion chamber surrounds the cooking chamber at least in sections at the sides and the combustion chamber is open to the cooking chamber. The combustion chamber and/or the cooking chamber also have an associated air inlet in a lower region and an associated air outlet in an upper region for the purpose of creating a chimney effect. A heating insert for arrangement in the roasting and/or grilling apparatus is also provided. The heating insert is exchangeable and is designed to accommodate a heat source. In this case, the heat source is a fossil fuel and/or a gas burner and/or a radiant electric heating element.

20 Claims, 7 Drawing Sheets

(56) References Cited

U.S. PATENT DOCUMENTS

| | | | |
|---|---|---|---|
| 3,079,909 A * | 3/1963 | Bemben | 126/25 R |
| 3,228,319 A | 1/1966 | Miller | |
| 5,836,295 A * | 11/1998 | Faraj | 126/25 R |
| 5,975,073 A * | 11/1999 | Kuo | 126/41 R |
| 6,467,402 B1 * | 10/2002 | Khinkis et al. | 99/417 |
| 7,025,589 B2 * | 4/2006 | Werz | 431/328 |
| 2005/0092190 A1 | 5/2005 | Ko et al. | |
| 2008/0121117 A1 | 5/2008 | Best | |

FOREIGN PATENT DOCUMENTS

| | | |
|---|---|---|
| DE | 1 923 591 | 9/1965 |
| DE | 35 00 001 A1 | 7/1986 |
| EP | 0 353 195 A1 | 1/1990 |
| FR | 2 685 862 A1 | 7/1993 |

OTHER PUBLICATIONS

English translation of International Preliminary Report on Patentability (Form PCT/IB/373) dated Sep. 25, 2012 (1 page).
English translation of Written Opinion of the International Searching Authority (Form PCT/ISA/237) (7 pages).
Office Action of German Patent Office issued in German Application No. 10 2010 013 437.6-16 dated Aug. 5, 2010 (2 pages).
International Search Report mailed Jun. 27, 2011 (6 pages).
Chinese Office Action issued in Appln. No. 201180025847.X dated Oct. 10, 2014 with Search Report dated Sep. 25, 2014 (6 pages).

* cited by examiner

Fig. 8
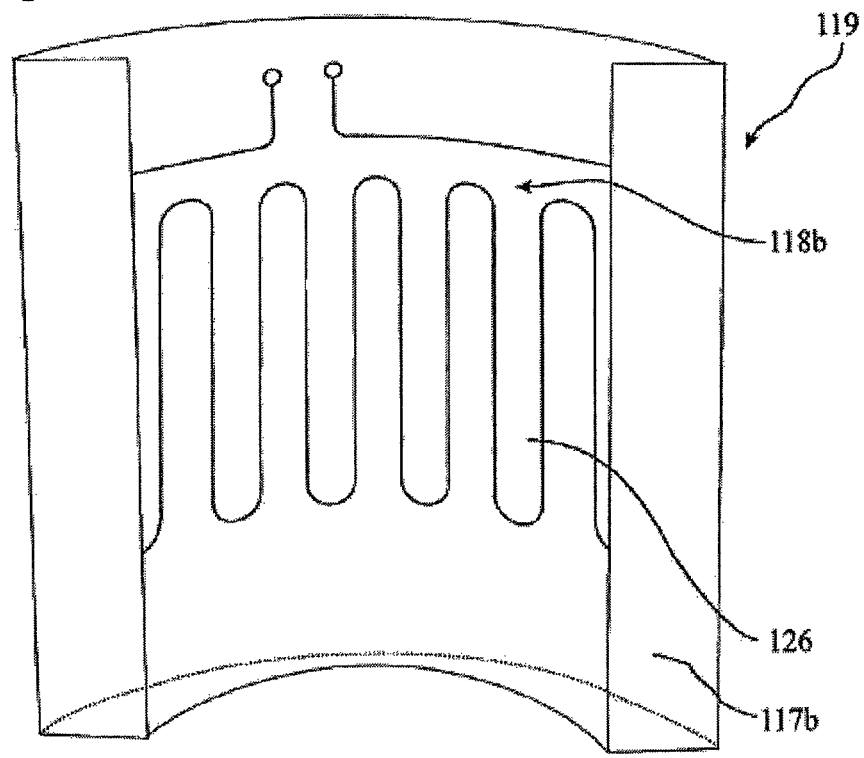
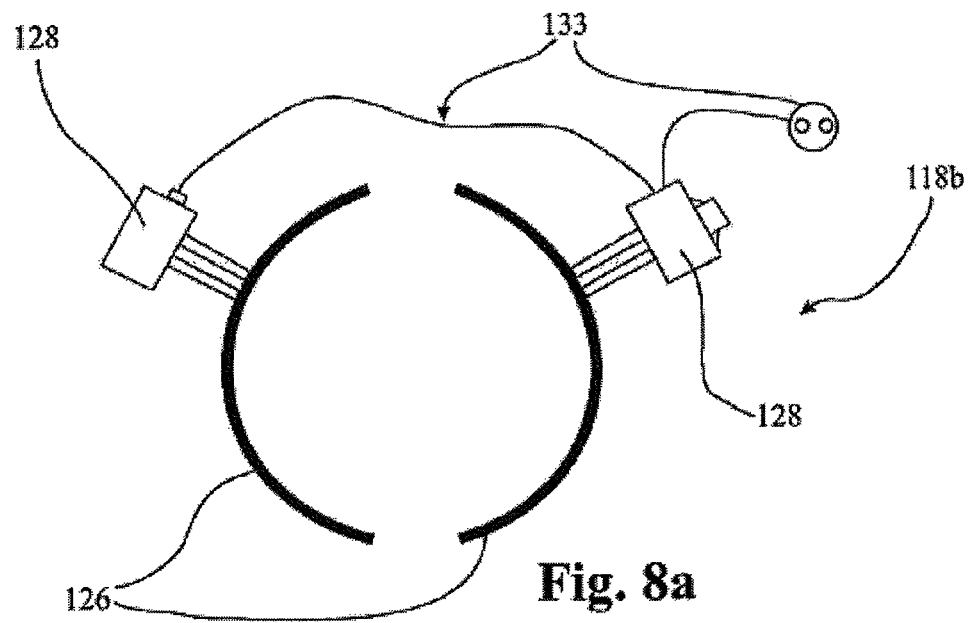
Fig. 8a

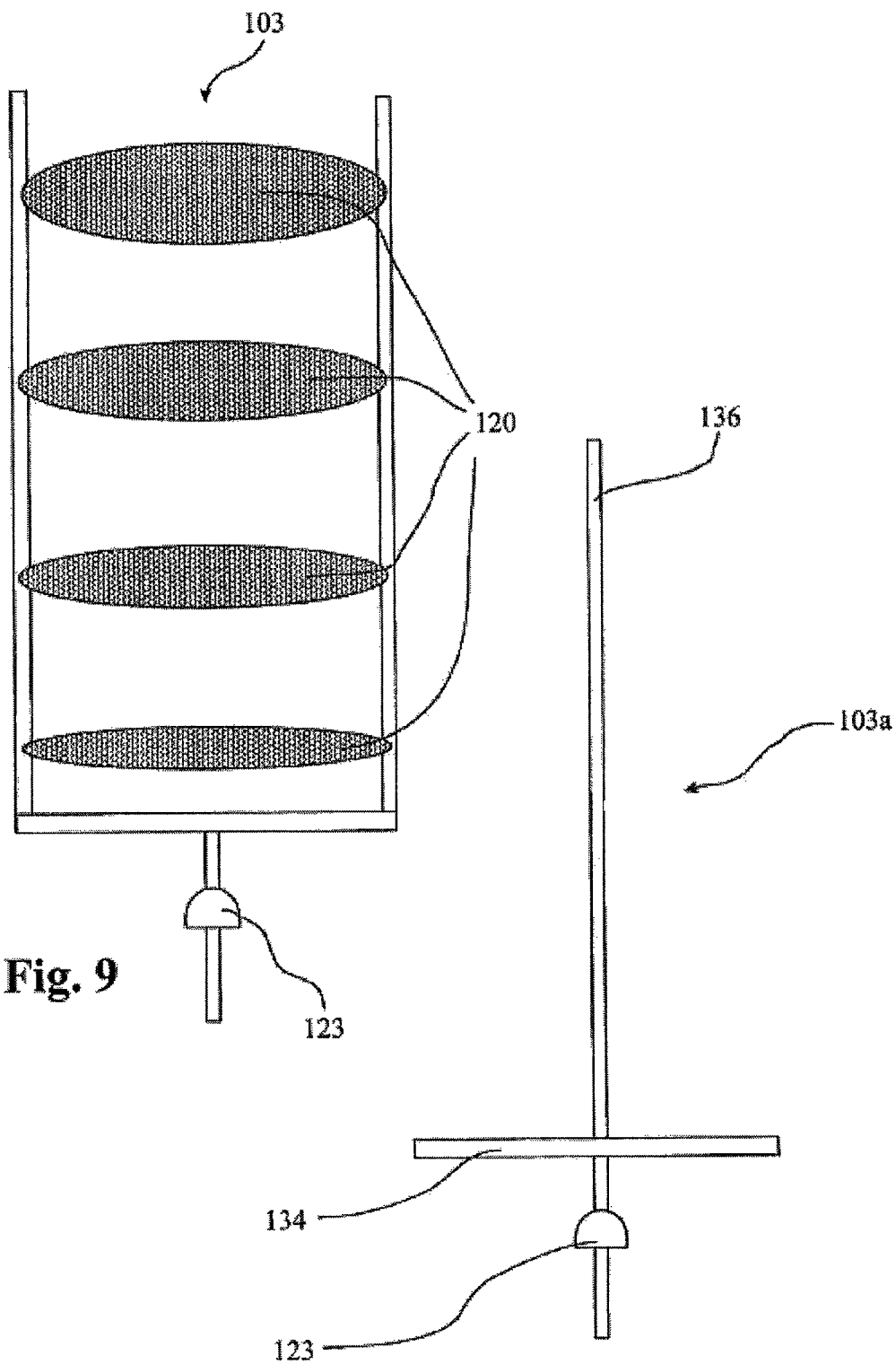

ROASTING AND/OR GRILLING APPARATUS AND HEATING INSERT FOR A ROASTING AND/OR GRILLING APPARATUS OF THIS KIND

FIELD OF THE INVENTION

The invention relates to a roasting and/or grilling apparatus for cooking food which is to be cooked, comprising a cooking chamber, a food holding unit arranged in the cooking chamber and a combustion chamber for the arrangement of a heating apparatus. Furthermore, the invention relates to a heating insert for a heating apparatus for arrangement in a roasting and/or grilling apparatus of this kind.

BACKGROUND OF THE INVENTION

Various roasting and/or grilling apparatuses for cooking food which is to be cooked are known from the prior art. Most roasting and/or grilling apparatuses have a combustion chamber arranged below a cooking chamber, wherein the combustion chamber is provided for the arrangement of a heating source, such as, for example, charcoal, and a grilling grate is customarily arranged in the cooking chamber. A disadvantage of said roasting and/or grilling apparatuses is that carcinogens may be produced by fat dripping down and catching fire.

SUMMARY OF THE INVENTION

It is the object of the invention to provide a roasting and/or grilling apparatus and a heating insert of the type mentioned at the beginning, with which improved cooking of food is obtainable in an energy-saving manner.

This object is achieved for the roasting and/or grilling apparatus in that the combustion chamber at least partially laterally surrounds the cooking chamber, wherein the combustion chamber is open toward the cooking chamber, and in that, in order to produce a chimney effect, an air inlet is assigned to the combustion and/or cooking chamber in a lower region and an air outlet is assigned to the combustion and/or cooking chamber in an upper region. The features used here "laterally", "at the top" and "at the bottom", which describe an absolute or relative positioning in space, refer to an orientation in the assembled operating state of the roasting and/or grilling apparatus. The solution according to the invention makes it possible, firstly, to avoid the production of carcinogens and, secondly, to use the heat radiation of a heating source more efficiently. Cooking should be understood as a general term for grilling, roasting or another form of preparing food by heating. For improved and efficient use of energy, the chimney function according to the invention is provided. The cooking chamber is preferably oriented upright and in the form of a column and is surrounded by the combustion chamber in the form of a jacket. It is advantageous if, in this case, the combustion chamber extends over a large part of the circumference of the cooking chamber and particularly preferably over the entire height thereof. The combustion chamber may also extend merely over part of the circumference and/or of the height of the cooking chamber. With the roasting and/or grilling apparatus according to the invention, shorter cooking times, high cooking quality and more efficient use of the heating source can be achieved by the combination of the chimney effect with direct heat radiation. The combustion chamber is closed to the outside in order to shield the combustion chamber and the cooking chamber from the environment.

In a preferred refinement of the invention, the cooking chamber is approximately cylindrical, and the combustion chamber surrounds said cylinder in the manner of a jacket. Instead of a cylindrical configuration, the combustion chamber and cooking chamber may also be of slightly conical design. In this case, an upward taper results in an advantageous reinforcement of the chimney effect.

In a development of the invention, the roasting and/or grilling apparatus has a heating apparatus arranged in the combustion chamber. In this case, the heating apparatus comprises at least one heating source, wherein the heating source is a fossil fuel, preferably a solid fuel, such as wood or coal, and/or a gas burner and/or a radiant electric heating element.

In a development of the invention, the heating apparatus has at least one heating insert for holding at least one heating source. This makes it possible to obtain improved positioning and securing of the heating source.

In a development of the invention, the heating insert is replaceable, and preferably without a tool. In an advantageous refinement, the heating insert is deposited on a deposition surface of the combustion chamber without an additional fixing means. Alternatively, a heating insert which is pushable into guide rails or is secured on retaining profiling of a boundary surface of the combustion chamber is provided. It is particularly advantageous if the heating source is also replaceable, either separately or together with the heating insert. For this purpose, the heating insert is preferably arranged so as to be releasable without a tool or by means of a tool. A defective heating source can thus be easily replaced, or a change can be made from fossil fuel to electric operation or to gas operation.

In a further refinement of the invention, the food holding unit and/or the heating apparatus is moveable, and therefore a distance between at least one heating source arranged in the combustion chamber and food which is to be cooked and is arranged in the cooking chamber can be changed at least in regions. The heat radiation acting on the food which is to be cooked can thereby be adjusted. In this case, the distance from the food which is to be cooked to the heating source cannot be changed uniformly over the entire extent of the cooking chamber or the internal region thereof but rather only relatively corresponding to the kinematics of the roasting and/or grilling apparatus. In an advantageous refinement, the combustion chamber is mounted moveably, in particular linearly moveably. The combustion chamber is understood as meaning a cavity or a clearance which is bounded on at least one side by a wall surface.

In a development of the invention, the combustion chamber is at least partially bounded by at least one door-like wing element. In this case, the wing element is moveable and is designed for the arrangement of the heating device. By movement of the door-like wing element, the distance between the inside door wall and the cooking chamber, and therefore between the heating source and food which is to be cooked and is located in the cooking chamber, can be changed. The wing element is preferably mounted rotatably here about a vertical axis, wherein the axis is preferably arranged outside the cooking chamber.

In a further refinement, an air inlet quantity at the air inlet and/or an air outlet quantity at the air outlet can be adjusted, at least within limits, by a mechanical control means. In this case, in particular, the control means is moveable. Corresponding mechanical control means may be operated manually or by motor. Suitable control means are in particular slides, apertures or similar flow conducting means.

In a development of the invention, the mechanical control means is a covering which is arranged in the region of the air outlet. In this case, the covering is designed in such a manner that the air outlet quantity is adjustable by changing an overlap of the air outlet by said covering. In an advantageous refinement, the covering is designed as a lid and is arranged above the cooking chamber and/or combustion chamber, wherein the covering is preferably arranged spaced apart from the upper edge of the cooking chamber and/or the combustion chamber. The roasting and/or grilling apparatus is advantageously made of stainless steel. However, it is also conceivable for individual parts to be at least partially composed of a different material. The lid may advantageously be designed as a skillet or as a similar bearing surface for food to be roasted, and may then contain a correspondingly suitable material with good heating properties in order to transmit contact heat. However, it may also be made of glass without a roasting function. The covering may be designed to be liftable or pivotable.

In a further refinement of the invention, the food holding unit is configured as a removable insert. In this case, the food holding unit may be of single-part or multi-part design.

In a preferred refinement, the food holding unit has at least one grilling grate, preferably a plurality of grilling grates arranged one above another in the form of tiers. In an advantageous refinement, the grilling grates may be removed separately from the food holding unit. The food holding unit may also comprise at least one spit onto which an item which is to be grilled can be placed. The spit or the entire food holding unit may be mounted rotatably. A drive for rotating the spit or the entire food holding unit may also be provided, said drive preferably being located below the cooking chamber.

In a further refinement, the combustion chamber is bounded to the outside by at least one lateral wall. In this case, the wall is at least partially heat-insulated by at least one heat insulation layer. In an advantageous refinement, the wall is double-walled and the cavity between the two walls may be filled with an insulating material, such as, for example, rock wool.

A heating insert according to the invention for the arrangement of a heating apparatus in an abovementioned roasting and/or grilling apparatus according to the invention is designed to be replaceable, preferably without a tool, and for holding at least one heating source. In this case, the heating source is a fossil fuel, such as, in particular, charcoal or wood, and/or a gas burner and/or a radiant electric heating element. Depending on the availability of the heating source, highly efficient grilling is obtainable.

In a development of the invention, the heating insert is designed for holding at least one heating source in the form of a fossil fuel, such as preferably charcoal, or coal, wood or briquettes. For this purpose, the heating insert has at least one basket-like compartment into which the heating source is placed. The heating insert preferably has a plurality of basket-like compartments arranged one above another and/or next to one another. When gas or electricity is used as the energy source, the heating insert is designed as a preassembled heating module which merely has to be inserted into the combustion chamber and connected to the corresponding energy source, such as a gas cylinder or a socket.

These and further features emerge not only from the claims but also from the description and the drawings, wherein the individual features can be realized on their own or together in the form of subcombinations in an embodiment of the invention and in other areas, and may represent embodiments which are advantageous and capable of being protected and for which protection is claimed here.

BRIEF DESCRIPTION OF THE DRAWINGS

Refinements of the invention are illustrated schematically in the drawings and are explained in more detail below. Some of the embodiments shown in the individual figures have features which are not illustrated in all of the embodiments shown or which do not have all of the refinements shown.

FIG. 8 shows, in a front view, an alternative exemplary embodiment of a heating insert with a radiant electric heating element as the heating source.

FIG. 8a shows, in top view, two radiant electric heating elements as the heating source for arrangement in a cylindrical combustion chamber.

FIG. 9 shows, in a front view, a food holding unit with a plurality of grilling grates arranged one above another in the form of tiers.

FIG. 9a shows, in a front view, a spit as the food holding unit.

DETAILED DESCRIPTION

Figure 1:
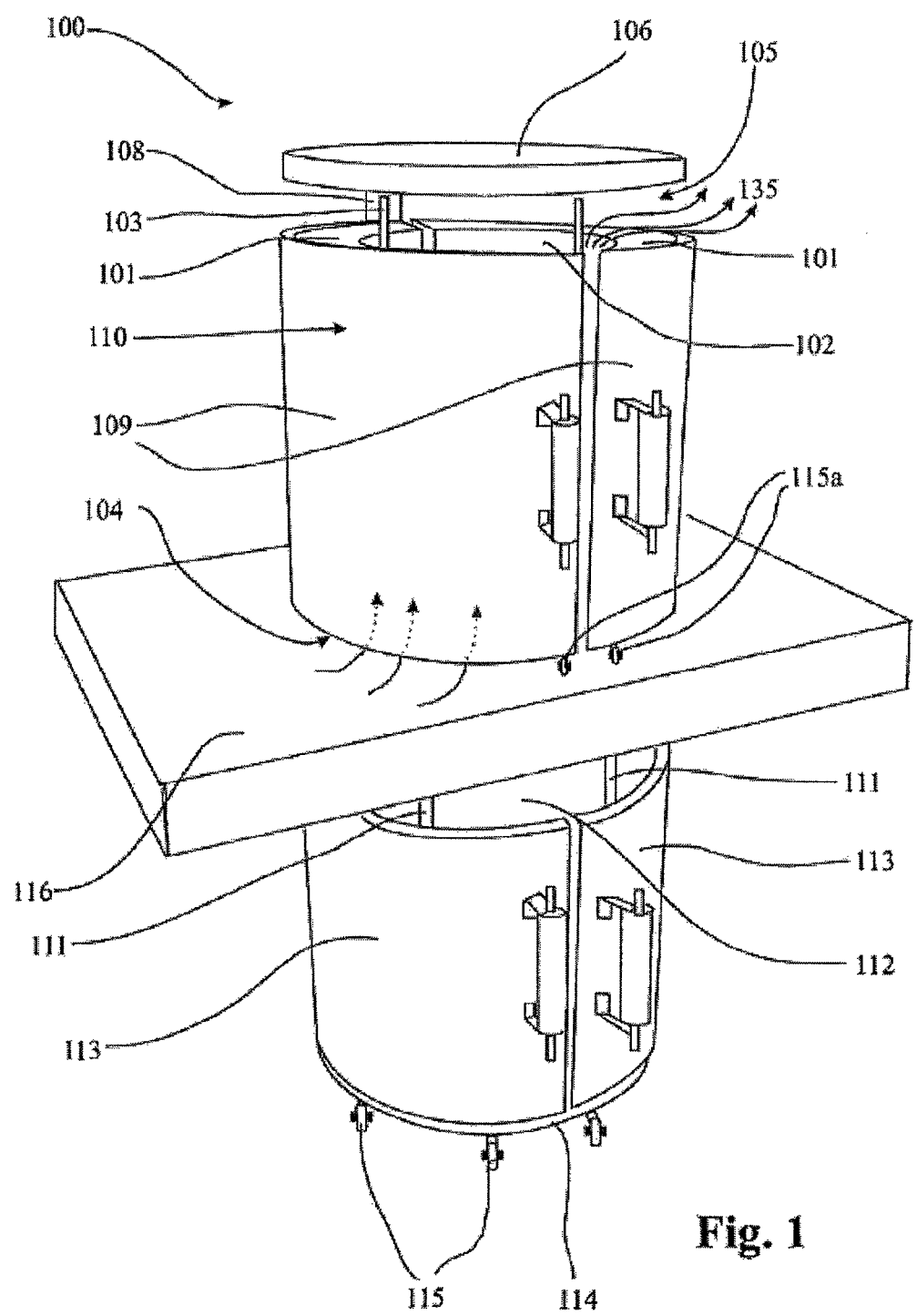
FIG. 1 shows an exemplary embodiment of a roasting and/or grilling apparatus according to the invention.

FIG. 1 illustrates an exemplary embodiment of a roasting and/or grilling apparatus 100 according to the invention. The exemplary embodiment shown has a cylindrical cooking chamber 102 and a combustion chamber 101 surrounding the latter laterally. In this case, the combustion chamber 101 is formed by two door-like wing elements 109, wherein both of the door-like wing elements 109 surround approximately half of the cooking chamber 102 in the circumferential direction. The two wing elements 109 are mounted pivotably about a common vertical spindle 108. In this exemplary embodiment, the combustion chamber 101 and the cooking chamber 102 are arranged above a table top 116 which, in turn, is supported by a frame 111. The food can thus be ergonomically loaded into and removed from the cooking chamber 102.

The roasting and/or grilling apparatus may also be designed as a table grill without an underframe and without a table top integrated into the roasting and/or grilling apparatus.

In the exemplary embodiment shown, the roasting and/or grilling apparatus 100 additionally has a storage chamber 112 below the table top 116, in particular for a gas cylinder or for grilling accessories. The storage chamber 112 is likewise accessible by moving door-like wing elements 113. The entire roasting and grilling apparatus 100 may be arranged on a base plate 114 with rollers 115 fitted therebelow. The rollers 115 enable the roasting and grilling apparatus easily to be moved from place to place. A food holding unit 103 is arranged in the cooking chamber 102. The roasting and/or grilling apparatus 100 has an air outlet 105 above the cooking chamber 102 and the combustion chamber 101 in order to discharge an air outlet quantity 135. Furthermore, for an adequate supply of fresh air, an air inlet 104 is provided between the table top 116 and the wing elements 109. For this purpose, the wing elements 109 are arranged spaced apart above the table top 116. It has proven advantageous for the exemplary embodiment shown if the wing elements are guided and supported on rollers 115a or similar rolling or sliding supporting elements in order to maintain said distance. However, they may also merely be mounted rotatably on the spindle 108 and moveable in a freely floating manner. Furthermore, the fresh air may flow into the cooking chamber 102 through an air inlet (not illustrated visibly here) below the table top 116. In order to adjust an air outlet quantity 135 and to cover the cooking chamber 102 a mechanical control means 106 in the form of a covering 106 is provided. In the exemplary embodiment illustrated, the covering 106 is located above the cooking chamber 102 and the combustion chamber 101 and is mounted in a horizontally rotatable manner on the upright, column-like spindle 108 which acts on the outer edge of the covering 106. By rotation of the covering 106 about the spindle 108, an overlap of covering 106 and combustion chamber 101 or cooking chamber 102 can be changed and an air outlet quantity 135 set. In another embodiment, the covering may also be mounted pivotably about a horizontal spindle in the manner of a flap.

Figure 2:
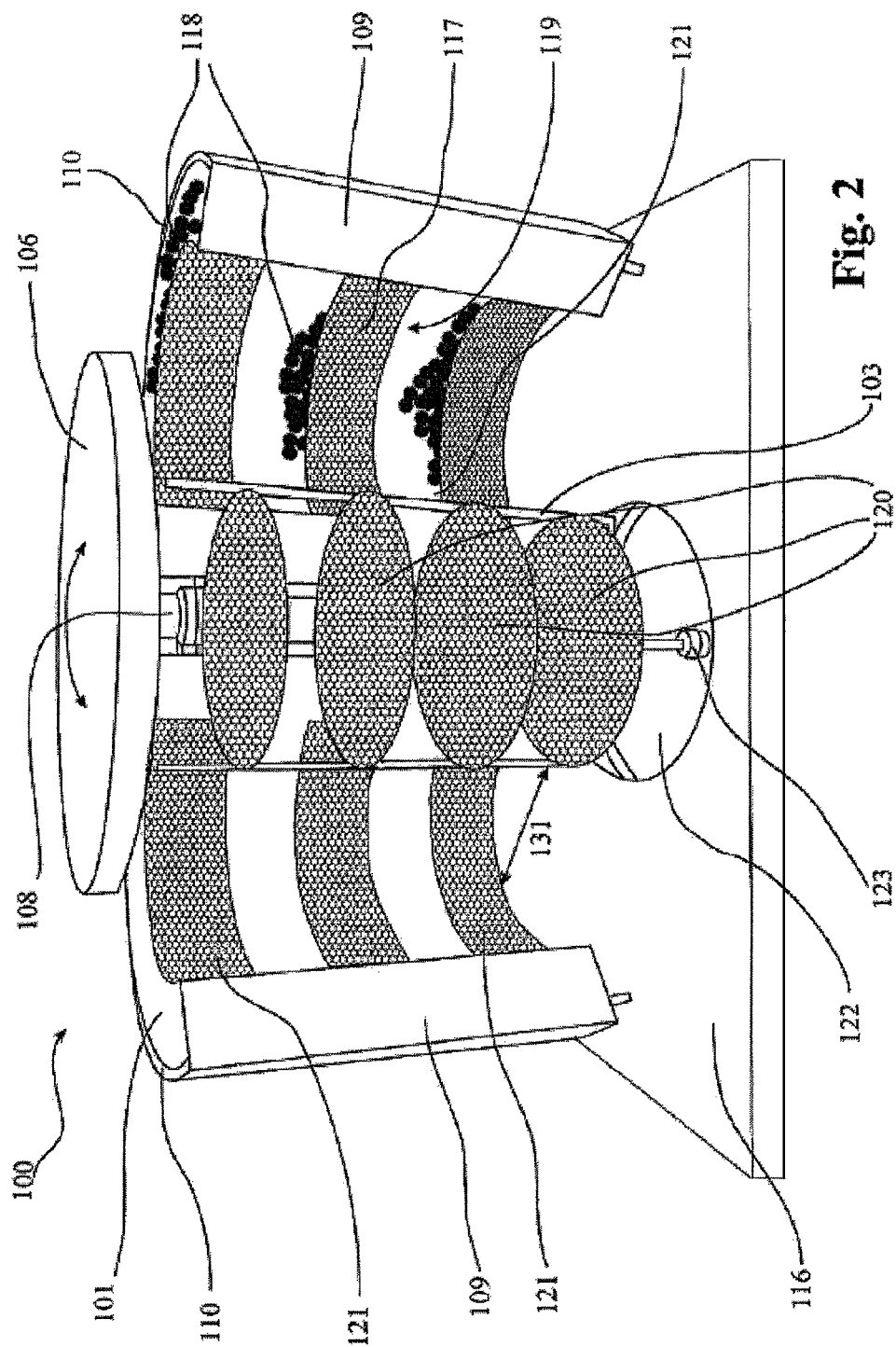
FIG. 2 shows, in a front view, a detail of the roasting and/or grilling apparatus from FIG. 1 in the open state.

FIG. 2 illustrates a detail of the roasting and/or grilling apparatus 100 from FIG. 1 in the open state in a front view. In this figure, the food holding unit 103 can readily be seen. The latter has a plurality of grilling grates 120 arranged one above another in the manner of tiers in order to hold the food which is to be cooked. In this exemplary embodiment, the food holding unit 103 is designed as a removable insert and is simply plugged into a bore in a frame (not depicted here), which bore is arranged below the table top 116. It is advantageous if a removable collecting trough 122 is provided below the cooking chamber 102. Said collecting trough serves to collect fat dripping down or other liquids. In this exemplary embodiment, the collecting trough 122 is arranged below the table top 116 which has a corresponding recess. In order to avoid soiling of the storage chamber 112 by fat dripping down, the food holding unit 103 has a drip guard 123 which is of approximately cap-shaped design and is pulled over the bore from above and conducts drops into the collecting trough 122.

The door-like wing elements 109 can readily be seen in this figure. The cooking chamber 102 is surrounded cylindrically by the combustion chamber 101 which is in the manner of a cylinder jacket. However, the cooking chamber may also be rectangular and surrounded by a combustion chamber consisting of two halves which are U-shaped in top view, wherein the combustion chamber halves are then advantageously moveable outward in a translatory manner.

In the exemplary embodiment depicted in FIG. 1, a heating apparatus 119 in the right door-like wing element 109 is provided with a heating insert 117 which is designed to hold fossil fuel, such as wood or coal, as the heating source 118. The combustion chamber 101 is bounded laterally by an outer wall 110. In this case, the outer wall 110 is preferably of double-walled design and the cavity between the two walls is filled with an insulating material, such as, for example, rock wool, which is advantageous, firstly, for more efficient use of the heating source 118 and, secondly, for safety reasons. The heat insulation prevents the outer walls of the grilling apparatus, in particular of the wing elements 109, from heating up too severely. In order to load and unload the roasting and/or grilling apparatus 100, the door-like wing elements 109 can be moved or rotated about the spindle 108. It is thereby also possible to change a distance 131 from the cooking chamber 102 to the combustion chamber 101 and therefore to the heating source 118.

Figure 3:
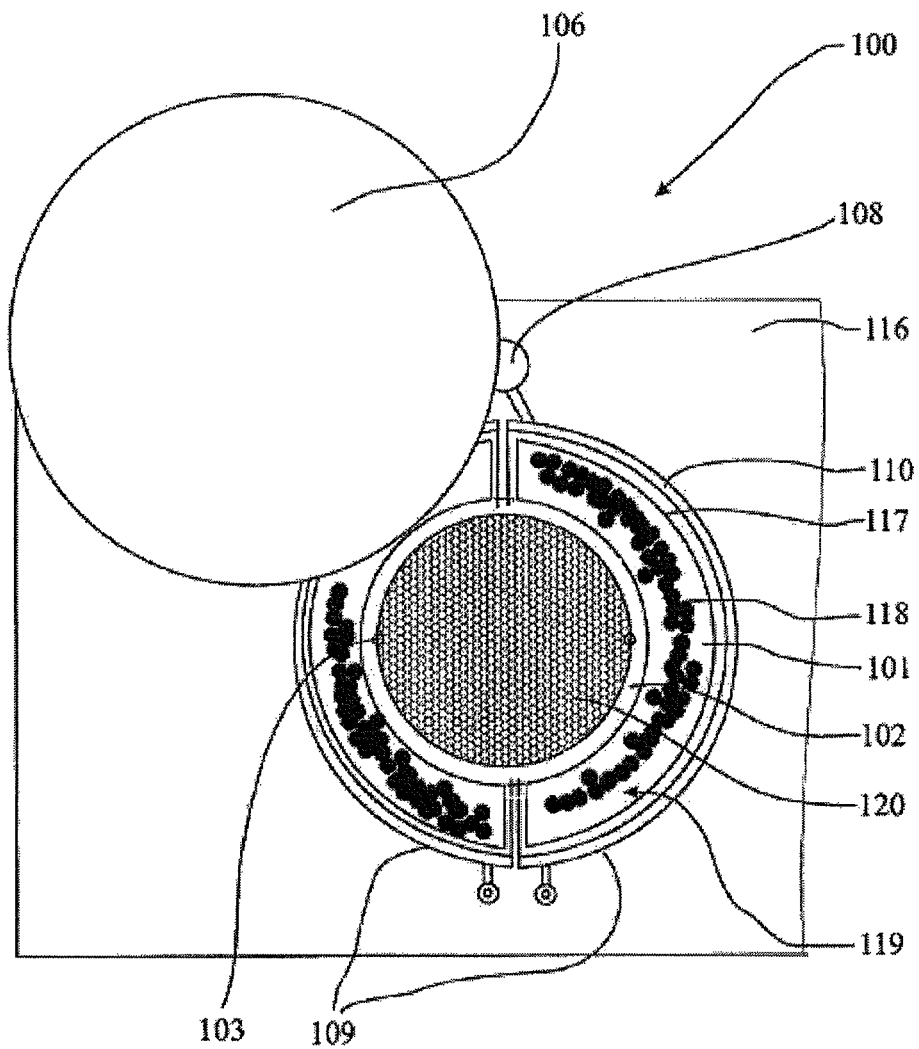
FIG. 3 shows, in top view, the roasting and/or grilling apparatus from FIG. 1 in the closed state with an air outlet quantity set virtually to the maximum.

FIG. 3 illustrates the top view of the roasting and/or grilling apparatus 100 from FIG. 1 with an air outlet quantity set virtually to the maximum. The spindle 108 and the covering 106 rotated about said spindle 108 can readily be seen. Furthermore, the figure shows the lateral, double-walled outer walls 110 of the combustion chamber 101 and the cooking chamber 102 with the food holding unit 103 arranged therein, and the uppermost grilling grate 120. The heating apparatus 119 arranged in the combustion chamber 101 has, as heating source 118, a fossil fuel in the form of charcoal, wherein the latter is held in a basket-like heating insert 117. A heating insert 117 is arranged in each of the two door-like wing elements 109. In the exemplary embodiment shown, the heating inserts 117 are merely placed into the combustion chamber 101. They are not screwed or fastened in a different manner, and therefore can be replaced without a tool. In order to hold the heating inserts 117, the wing elements 109 have side members which project inward to the cooking chamber and flank lateral boundaries of the heating inserts 117.

Figure 4:
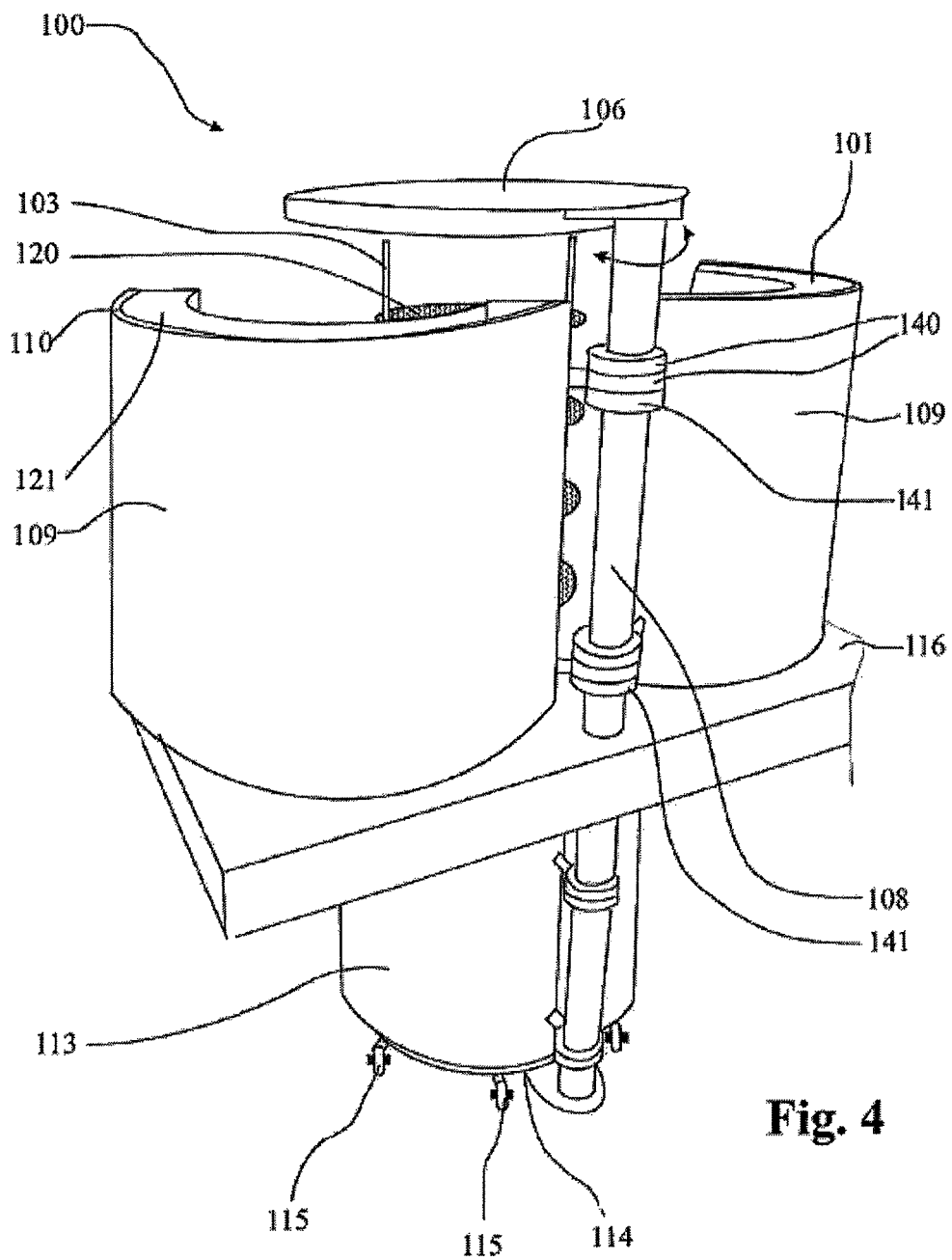
FIG. 4 shows, in a rear view, the roasting and/or grilling apparatus from FIG. 1 in the open state.

FIG. 4 illustrates a rear view of the roasting and/or grilling apparatus 100, which is shown in FIG. 1, in the open state for better understanding. The spindle 108 and the bearings 140 of the wing elements 109 and of the doors 113 of the storage chamber 112 can readily be seen here. The bearings 140 may be designed, for example, as simple plain bearings and held in their position by an axial securing means 141. The securing means 141 are advantageously height adjustable along the spindle 108 such that, by changing the position of the securing means 141, the distance from the wing element 109 to the table top 116 and thus to the air inlet 104 can be adjusted.

Figure 5:
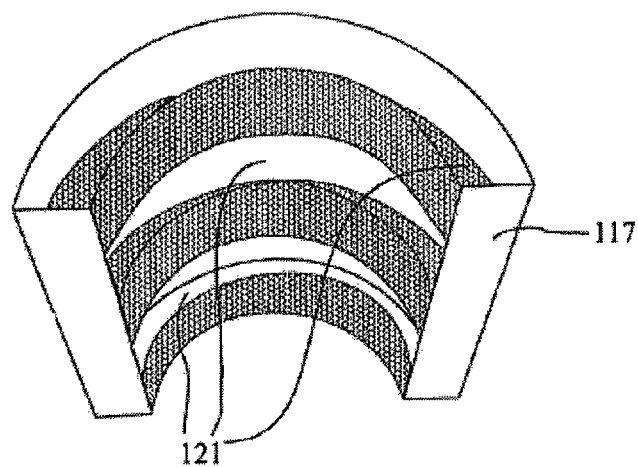
FIG. 5 shows a heating insert according to the invention in a view obliquely from above.

FIG. 5 shows, for better understanding, a heating insert 117 which is designed for holding coal or wood. The heating insert 117 has a plurality of basket-like compartments 121 arranged one above another, wherein the compartments 121 are preferably formed by correspondingly arranged perforated plates. However, lattice grates are also conceivable instead of perforated plates or a closed plate, but this reduces the direct heat radiation into the cooking chamber.

Figure 6:
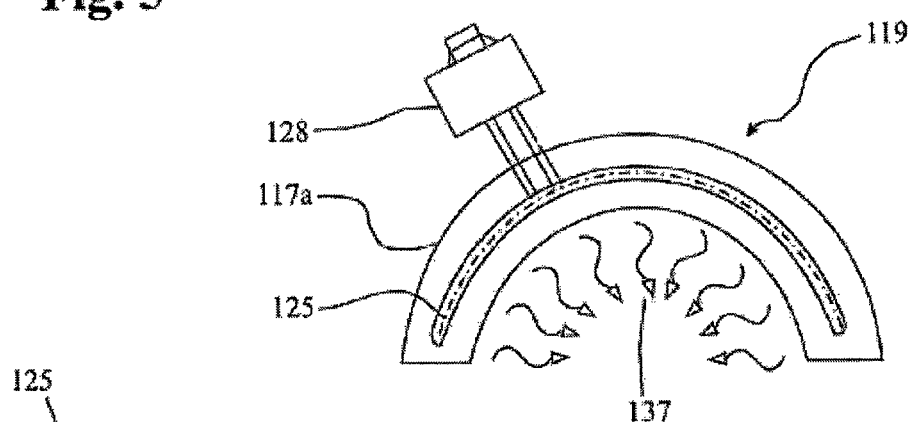
FIG. 6 shows, in top view, an alternative exemplary embodiment of a heating insert for holding a gas burner as a heating source, with heat radiation being output.

FIG. 6 shows, in top view, a heating insert 117a with a gas burner 125 as the heating source 118a, wherein the intensity of the heat radiation 117 is adjustable via a controller 128.

Figure 7:
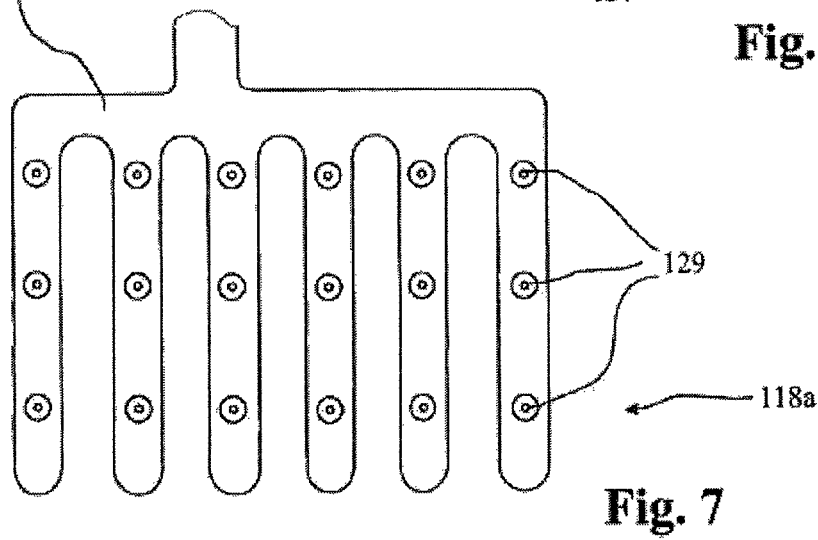
FIG. 7 shows, in a front view, a gas burner as the heating source.

FIG. 7 illustrates a gas burner 125 with gas outlet nozzles 129, as an exemplary embodiment of a heating source 118a.

FIG. 8 illustrates, in a front view, a heating insert 117b with a radiant electric heating element 126 arranged therein as the heating source 118b. Of course, different geometries for the radiant heating element are possible. FIG. 8a shows, as heating source 118b, a top view of two radiant electric heating elements for a combustion chamber, which is designed in the form of a cylinder jacket. The controller 128 and the power supply 133 including the required lines, etc. are preferably arranged on the rear side and laterally from the outside on the outer wall of the roasting and/or grilling apparatus.

FIG. 9 illustrates the food holding unit 103 with a plurality of grilling grates 120, which are arranged one above another in the form of tiers, separately in the removed state. The drip guard 123 can readily be seen here. FIG. 9a shows an alternative food holding unit 103a in the form of a spit 136. An axial securing disk 134 is preferably provided at the bottom. According to an embodiment (not illustrated), said disk may also be provided as a collecting plate for fat and meat juice. In one possible refinement, a drive for rotating the food holding unit 103a or also the food holding unit 103 with the grilling grates 120 may also be provided in the roasting and/or grilling apparatus. The rotary drive is advantageously arranged below the cooking chamber, and most optimally below the collecting trough. For this purpose, a force transmission unit between a driving motor and the spit 136 is provided in the form of a belt or gearwheel drive.

The invention claimed is:

1. A roasting and/or grilling apparatus for cooking food comprising a cooking chamber, a food holding unit arranged in the cooking chamber and a combustion chamber, wherein the combustion chamber at least partially laterally surrounds the cooking chamber in the form of a jacket, wherein the combustion chamber is open toward the cooking chamber, and in order to produce a chimney effect, an air inlet is assigned to the cooking chamber in a lower region and an air outlet is assigned to the cooking chamber in an upper region, wherein the roasting and/or grilling apparatus has at least one heating apparatus arranged in the combustion chamber, wherein the heating apparatus has at least one heating source and the heating source is at least one of: a fossil fuel; a gas burner; and a radiant electric heating element, wherein at least one of: the food holding unit; and the heating apparatus, is/are movable at least in regions in order to change a distance between the at least one heating source arranged in the combustion chamber and food to be cooked in the cooking chamber.

2. The roasting and/or grilling apparatus as claimed in claim 1, wherein the roasting and/or grilling apparatus has an approximately cylindrical cooking chamber, and in that the combustion chamber surrounds the cooking chamber in the manner of a cylinder jacket.

3. The roasting and/or grilling apparatus as claimed in claim 1, wherein the heating apparatus has at least one heating insert which holds the at least one heating source, and at least one of: the combustion chamber; and the heating insert is/are configured to permit replacement of the heating insert in the combustion chamber without the use of a tool.

4. The roasting and/or grilling apparatus as claimed in claim 1, wherein the combustion chamber is at least partially designed as at least one door-shaped wing element, and the wing element is movable and is designed for cooperation with the heating apparatus.

5. The roasting and/or grilling apparatus as claimed in claim 1, wherein at least one of: an air inlet quantity at the air inlet; and an air outlet quantity at the air outlet is adjustable, at least within limits, by a movable mechanical control.

6. The roasting and/or grilling apparatus as claimed in claim 5, wherein the mechanical control is a covering, and the covering is arranged in the region of the air outlet and is designed in such a manner that the air outlet quantity is adjustable by changing an overlap of the covering and the air outlet.

7. The roasting and/or grilling apparatus as claimed in claim 1, wherein the food holding unit is designed as a removable insert, and the food holding unit has at least one of: a plurality of grilling grates arranged one above another in the form of tiers; and a spit.

8. The roasting and/or grilling apparatus as claimed in claim 1, wherein the combustion chamber is bounded on the outside by at least one lateral outer wall, and the outer wall is at least partially heat-insulated.

9. The roasting and/or grilling apparatus as claimed in claim 3, wherein the heating insert is designed to hold fossil fuel as the heating source, the fossil fuel being at least one of: coal; wood; and briquettes, and the heating insert has at least one basket-shaped compartment in which the fossil fuel is disposed.

10. The roasting and/or grilling apparatus as claimed in claim 9, wherein the heating insert has a plurality of basket-shaped compartments arranged at least one of: one above the other; and next to one another.

11. A roasting and/or grilling apparatus for cooking food, comprising a cooking chamber, a food holding unit arranged in the cooking chamber, a combustion chamber and a heating apparatus, wherein the combustion chamber at least partially laterally surrounds the cooking chamber in the form of a jacket, wherein the combustion chamber is open toward the cooking chamber, and in order to produce a chimney effect, an air inlet is assigned to the cooking chamber in a lower region and an air outlet is assigned to the cooking chamber in an upper region, wherein the combustion chamber is at least partially designed as at least one door-shaped wing element, wherein the wing element is movable and is designed for cooperation with the heating apparatus.

12. The roasting and/or grilling apparatus as claimed in claim 11, wherein the roasting and/or grilling apparatus has an approximately cylindrical cooking chamber, and the combustion chamber surrounds the cooking chamber in the manner of a cylinder jacket.

13. The roasting and/or grilling apparatus as claimed in claim 11, wherein the heating apparatus is arranged in the combustion chamber and has at least one heating source, and the heating source is at least one of: a fossil fuel; a gas burner; and a radiant electric heating element.

14. The roasting and/or grilling apparatus as claimed in claim 11, wherein the heating apparatus has at least one heating insert which holds at least one heating source, and at least one of: the combustion chamber; and the heating insert is/are configured to permit replacement of the heating insert in the combustion chamber without the use of a tool.

15. The roasting and/or grilling apparatus as claimed in claim 11, wherein the heating apparatus has at least one heating source, and at least one of: the food holding unit; and the heating apparatus is/are movable at least in regions in order to change a distance between the heating source arranged in the combustion chamber and food to be cooked in the cooking chamber.

16. The roasting and/or grilling apparatus as claimed in claim 11, wherein at least one of: an air inlet quantity at the air inlet; and an air outlet quantity at the air outlet is adjustable, at least within limits, by a movable mechanical control, wherein the mechanical control is a covering, and the covering is arranged in the region of the air outlet and is designed in such a manner that the air outlet quantity is adjustable by changing an overlap of the covering and the air outlet.

17. The roasting and/or grilling apparatus as claimed in claim 11, wherein the food holding unit is designed as a removable insert, and the food holding unit has at least one of: a plurality of grilling grates arranged one above another in the form of tiers; and a spit.

18. The roasting and/or grilling apparatus as claimed in claim 11, wherein the combustion chamber is bounded on the outside by at least one lateral outer wall, and the outer wall is at least partially heat-insulated.

19. The roasting and/or grilling apparatus as claimed in claim 11, wherein the heating apparatus is arranged in the combustion chamber and has at least one heating insert designed to hold fossil fuel as a heating source, the fossil fuel being at least one of: coal; wood; and briquettes.

20. The roasting and/or grilling apparatus as claimed in claim 19, wherein the heating insert has a plurality of basket-shaped compartments arranged at least one of: one above another; and next to one another.

* * * * *